US007099664B1

(12) United States Patent
Hurst (10) Patent No.: US 7,099,664 B1
(45) Date of Patent: Aug. 29, 2006

(54) SCRIPT BUILDING METHOD AND SYSTEM FOR WIRELINE AND WIRELESS TELEPHONE SWITCHES

(75) Inventor: Harold Ray Hurst, Miami, FL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 483 days.

(21) Appl. No.: 10/035,675

(22) Filed: Dec. 28, 2001

(51) Int. Cl.
H04Q 7/20 (2006.01)
(52) U.S. Cl. .................. 455/428; 455/418; 455/432.2; 370/252; 370/401
(58) Field of Classification Search ............... 455/418, 455/575.1, 550.1, 419, 432.1, 422, 424, 403, 455/428, 432.2, 445, 560, 561, 554.2, 425, 455/435.2, 436, 557, 422.1, 420, 552.1, 426.1, 455/426.2, 63.2; 379/265, 220, 222, 224, 379/229, 207, 219, 230, 235, 267, 88.19–88.21, 379/265.11, 265.09; 709/223, 226, 229, 709/244; 395/701; 345/333, 335; 370/252, 370/254, 401, 402, 403–410, 465, 347, 430, 370/422, 467, 545, 468; 717/100, 164, 165, 717/168; 710/5, 18, 19, 23
See application file for complete search history.

(56) References Cited

U.S. PATENT DOCUMENTS 5,845,207 A * 12/1998 Amin et al. ............. 455/414.1
5,982,869 A * 11/1999 Lozano et al. ......... 379/220.01
6,330,598 B1 * 12/2001 Beckwith et al. ........... 709/223
6,574,661 B1 * 6/2003 Delano et al. .............. 709/223
6,725,032 B1 * 4/2004 Sheridan et al. ............ 455/419

* cited by examiner

Primary Examiner—Edward F. Urban
Assistant Examiner—Charles Chow
(74) Attorney, Agent, or Firm—Merchant & Gould (57) ABSTRACT

A method and system are provided for formatting data for populating a wireline or wireless telephone switch with required data such as NPA-NXX data, routing information, and roaming information for roaming wireless telephone users. A switch script-building software program extracts formatted output data from an existing switch and converts the output data into input-formatted data that is acceptable for sending back to the switch or to a plurality of switches. A graphical user interface is launched by the script-building software program for providing user interaction with the software program and for displaying downloaded output-formatted data from the switch and input-formatted data after the data format conversion. After the data is converted from output format to input format, the input-formatted data is edited to include new information, or to edit or delete existing information. After all edits are made, the input-formatted information is sent directly to the switch or switches as desired, eliminating the need to manually recreate input formatting required by the switch or switches each time new data or edits to existing data are required for a given switch or plurality of switches.

10 Claims, 10 Drawing Sheets

"SCRIPT BUILDING METHOD AND SYSTEM FOR WIRELINE AND WIRELESS TELEPHONE SWITCHES

FIELD OF THE INVENTION

This invention relates to a method and system for populating wireline and wireless telephone network switches with required operational data such as NPA-NXX data, routing information and roaming information for roaming wireless telephone users.

BACKGROUND OF THE INVENTION

In a telecommunications system, wireline and wireless switches receive and route voice and non-voice data from one address on the telecommunications system to another address. A switch looks at incoming data to determine the destination address, and based on that address, a transmission path is set up by the switch to route data associated with a voice call or data transmission to an intended address. In wireless telecommunications systems, wireless switches contain data associated with wireless telephone users who may legitimately operate their wireless telephones in a given wireless telecommunications system via those switches. That is, in order for a wireless telephone to operate through a given wireless switch, that wireless switch must include data on the wireless telephone such as the wireless NPA-NXX data, identification information on the wireless telephone and roaming privileges information for the telephone if that wireless telephone is using the wireless switch as a roaming switch.

In order to populate a given wireline or wireless switch with required data to allow telephone users to operate through the switch, a data entry operator for the telecommunications system operating the switch must send data messages to the switch to provide the switch with the necessary data. For example, the NPA-NXX number of the telephone, identification information on the telephone, roaming privileges, and billing data must be populated on the switch so that the switch will recognize calls from the telephone and process those calls accordingly.

Each time a telephone is activated in a given telecommunications system, data, as described above, required for operating the telephone in the telecommunications system must be populated in each of the switches in the system. For wireless systems, if one telecommunications system arranges for its wireless users to have roaming privileges on a separate telecommunications system, the first system must send data on each of its wireless users to the second telecommunications system so that the data may be populated on the second telecommunications system's wireless switches to allow the wireless telephones of the first telecommunications system to operate via the switches of the second system.

Most switches require data to be entered according to specific message formats. A data entry operator of the telecommunications system connects directly to the switch, for example, via a well-known Telnet program that allows the data entry operator to connect to and sign on to the switch in order to enter required data. Unfortunately, many switches, such as those manufactured by Ericsson, Inc., require data entry on a command-line basis according to a specific format. Therefore, each time additions or changes need to be made to the data of such a switch, the data entry operator must connect to the switch and add data or edit data on a line by line basis according to the particular data format for the switch. This process becomes cumbersome, time consuming, and error producing when the data entry operator must add the data for hundreds of new subscribers or new wireless roaming arrangements on a daily basis.

It is with respect to these considerations and others that the present invention has been made.

SUMMARY OF THE INVENTION

In accordance with the present invention, the above and other problems are solved by a method and system for formatting data for populating a telephone switch with required operational data such as NPA-NXX data, routing information, and roaming information for roaming wireless telephone users. A switch script-building software program extracts formatted output data from an existing switch and converts the output data into input-formatted data that is acceptable for sending back to the switch or to a plurality of switches. According to one aspect of the invention, a graphical user interface is launched by the script building software program for providing user interaction with the software program and for displaying downloaded output-formatted data from the switch and input-formatted data after the data format conversion. After the data is converted from output format to input format, the input-formatted data is edited to include new information, or to edit or delete existing information. After all edits are made, the input-formatted information is sent directly to the switch or switches as desired, eliminating the need to manually recreate input formatting required by the switch or switches each time new data or edits to existing data are required for a given switch or plurality of switches.

These and other features and advantages, which characterize the present invention will be apparent from a reading of the following detailed description and a review of the associated drawings. It is to be understood that both the foregoing general description and the following detailed description are exemplary and explanatory only and are not restrictive of the invention, as claimed.

DETAILED DESCRIPTION OF THE PREFERRED EMBODIMENT

Figure 1:
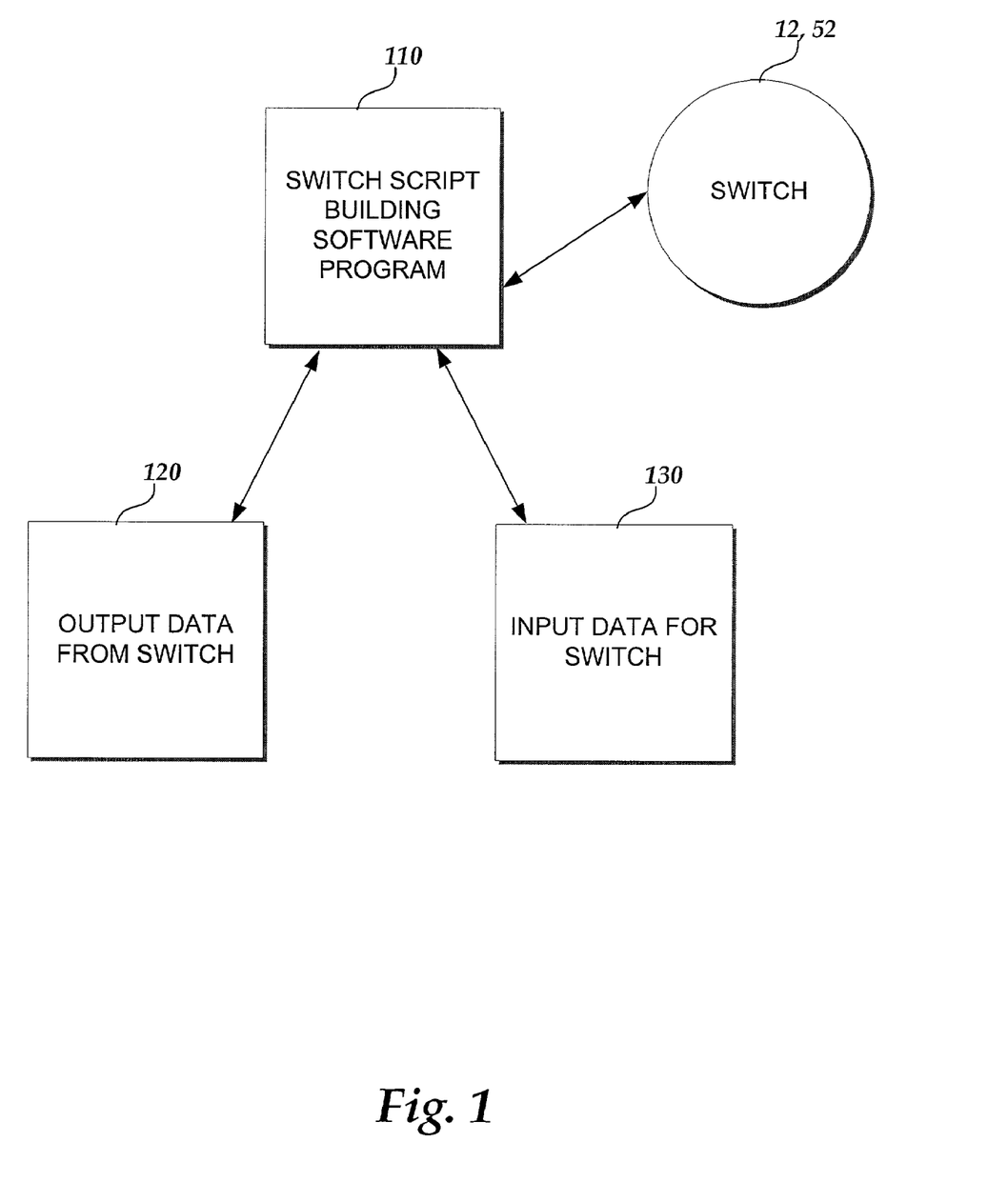
FIG. 1 is a block diagram illustrating the relationship between a switch script building software program and the output data and input data for a wireless telecommunications switch.

The following description of an exemplary embodiment of the present invention is made with reference to the above-described drawings wherein like numerals refer to like parts or components throughout the several figures. The present invention is directed toward a method and system for formatting data for populating a wireline or wireless telephone network switch with the required operational data, such as NPA-NXX data, routing information, roaming information for roaming wireless telephone users and the like. Referring now to FIG. 1, according to an embodiment of the present invention a switch script building software program 110 extracts formatted output data 120 from an existing switch 12, 52 and then converts the output data into input data 130 in a format acceptable for sending back to the switch 12, 52 or to a separate switch. After the data is converted from output format to input format, the input-formatted data is edited to include new information, or to edit or delete existing information. After all edits are made, the input-formatted information is sent directly to the switch 12, 52 and is accepted.

For example, if new NPA-NXX data for new wireline or wireless telephone users needs to be programmed into a given wireline switch 12 or wireless switch 52, a data entry operator of the telecommunications system operating the switch 12, 52 connects to the switch via a well-known Telnet session or other file transfer or data transfer protocol that allows the operator to connect directly to the computing systems of the switch 12, 52 for data entry and data editing. As should be understood by those skilled in the art, the data entry operator may connect to a plurality of switches 12, 52 for entry of and editing of data for a number of switches simultaneously. Operation of Telnet programs for connecting to the switch 12, 52 for data entry and data editing is well known to those skilled in the art. According to the present example, after the operator connects to the switch 12, 52, the operator, using the script building software program 110, downloads from the switch as output data, a present set of NPA-NXX data currently programmed into the switch.

Upon operator initiation, the program 110 converts the output data 120 into input data 130 formatted for receipt by the switch 12, 52. After conversion, the operator adds the new NPA-NXX data as text edits to the now input-formatted data. The edited input-formatted data is then sent back to the switch 12, 52 and is accepted by the switch. Alternatively, the edited input-formatted data may be sent to a separate switch or to a set of switches so that the new numbers will be populated in each desired switch. The switch 12, 52 or other switches to which the edited input-formatted data is sent now have more NPA-NXX data of the telephone exchanges programmed into them under which new wireless telephone users may dial.

Accordingly, the data entry operator does not have to create newly formatted line-by-line instructions to provide the switch or switches with the new data. The data entry operator only has to add the new data into an already formatted message set and send the message set to the desired switches. Rather than recreating the format for messages acceptable by the switches each time data is entered or existing data is edited, the data entry operator may save time and reduce the probability of error by using already acceptable formatted data from a switch as a format or form that may be edited and sent back to the switch or to other switches. As described in detail below, any data that may be populated into a given switch may be populated using the method and system of the present invention. For example, the aforementioned NPA-NXX data, routing information necessary for communication paths between switches, and roaming privileges information to allow roaming wireless telephone users to operate under the wireless telephone switches of a separate wireless telephone system may be added or edited at switches according to the present invention.

Exemplary Operating Environment

Figure 2:
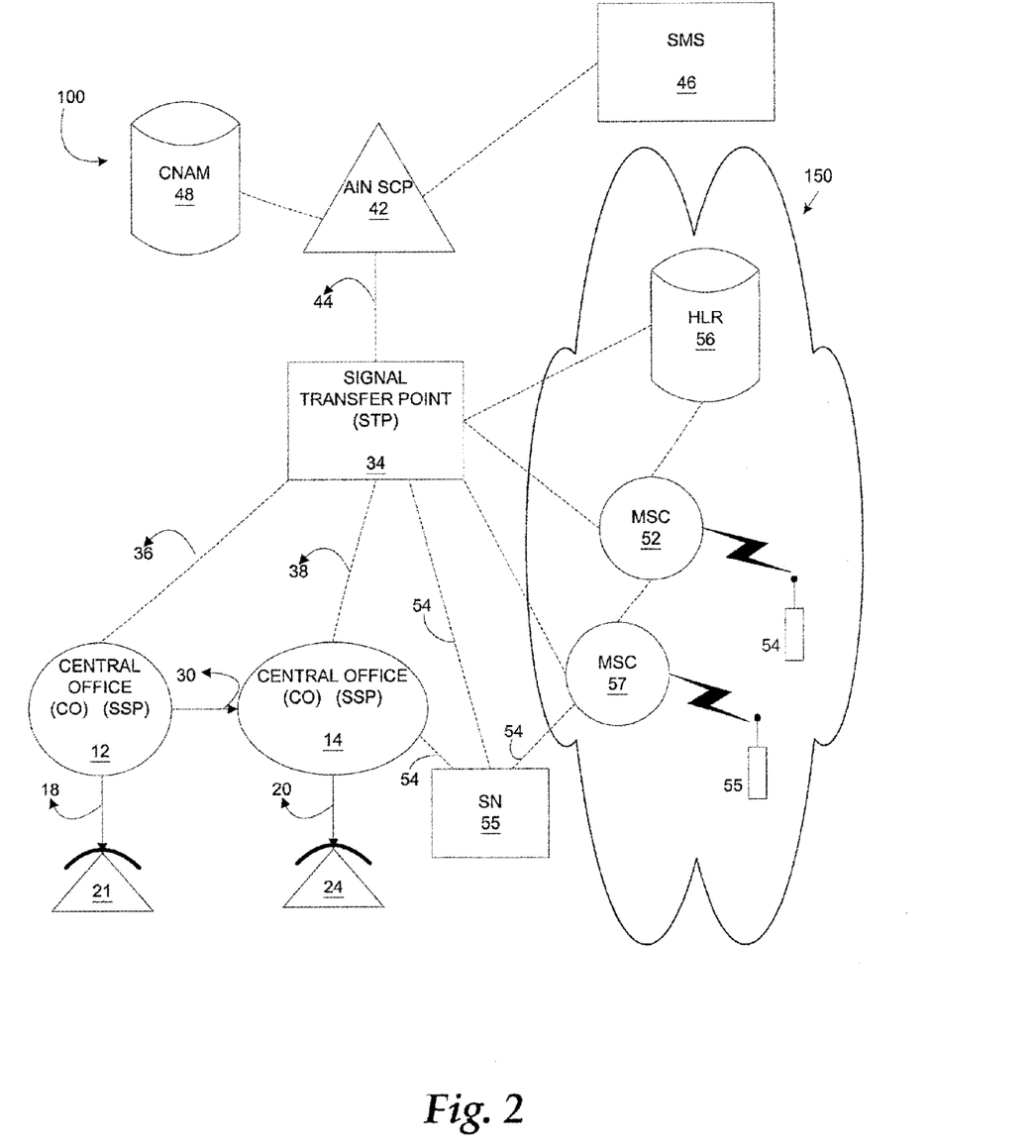
FIG. 2 is a block diagram illustrating components of a telephone network that provides an exemplary operating environment for the present invention.

It is advantageous to describe an exemplary operating environment in which the current invention may reside. FIG. 2 is a block diagram illustrating components of a telephone network that provides an exemplary operating environment for the present invention.

The modern public switched telephone network (PSTN) has separate signaling paths for voice signals (or other customer-utilized communication circuits) and for control signals, which include information transmitted throughout the network to control the connection and disconnection of the voice circuits. The public switched telephone network that evolved in the 1980s incorporated the advanced intelligent network (AIN). Some of the components of the advanced intelligent network are illustrated in FIG. 2. FIG. 2 is a block diagram representing at least a part of the advanced intelligent network (AIN) 100 of a typical local exchange carrier integrated with components of a wireless network 150. The advanced intelligent network (AIN) uses the signaling system 7 (SS7) network for signal or system control message transport. The components thereof are well known to those skilled in the art. The operation of many of the components of the advanced intelligent network is also described in U.S. Pat. No. 5,245,719 to Weisser entitled "Mediation of Open Advanced Intelligent Network Interface by Shared Execution Environment" which is incorporated herein by reference. The SS7 communications protocol is provided in the document entitled "Bell Communications Research Specification of Signaling System 7," Document TR-NWT-000246, Issue 2 (June 1991), plus Revision 1 (December 1991), which is also incorporated herein by reference.

A plurality of central offices is provided in a typical public switched telephone network. As shown in FIG. 2, each central office may include an electronic switch known to those skilled in the art as a service switching point (SSP). These are indicated in FIG. 2 as SSP switches 12 and 14. The number of SSP switches depends on the number of subscribers to be served by the public switched telephone network. An SSP is the AIN component of a typical electronic central office switch used by a local exchange carrier. The terms "SSP" and "switch" are used interchangeably hereinafter and are understood to refer to a telecommunications switch having AIN capability and which may be utilized for connecting voice channel circuits, including voice channel lines, such as trunk circuits 30 and 32.

As shown in FIG. 2, central offices switches (SSP) 12 and 14 have a plurality of subscriber lines 18 and 20 connected thereto. Each of the subscriber lines 18 and 20 is connected to a terminating piece or pieces of customer premises equipment that are represented by telephones 21 and 24. SSP switches 12 and 14 are connected by a plurality of trunk circuits 30. These are the voice path trunks that interconnect the central offices 12 and 14 and over which calls are connected when completed.

Each piece of terminating equipment in the PSTN is preferably assigned an NPA-NXX or directory number. The term "directory number" is used herein in a manner consistent with its generally understood meaning of a number that is dialed or input by an originating party at an originating station to reach a terminating station associated with the directory number. A directory number, typically a ten digit number, is commonly referred to as a "telephone number" and may be assigned to a specific telephone line, such as the telephone line 18 shown in FIG. 2. As is well known to those skilled in the art, a numbering plan area (NPA) is synonymous with area codes used in the construction of telephone directory numbers. NXX is the seven-digit code typically following the area code in a conventional telephone directory number.

Much of the intelligence, and the basis for many of the enhanced features of the network, resides in the local service control point (SCP) 42 that is connected to signal transfer point 34 via SS7 data link 44. As is known to those skilled in the art, service control points, such as the SCP 42, are physically implemented by relatively powerful fault tolerant computers. Among the functions performed by the service control points is maintenance of network databases used in providing enhanced services.

The wireless network 150, such as a cellular network, comprises a mobile switching center (MSC) 52. The MSC 52 is a switch providing services and coordination between wireless users in the network 150 and external networks. The MSC 52 may be connected to STP 34 to provide information to the wireline network and receive information from the wireline network. The switch 52 also communicates with a wireless subscriber, such as wireless telephones 54 and 55.

The wireless switch 52 may also be connected to a home location register (HLR) 56. The HLR is an SS7 database used to identify/verify a wireless subscriber. The HLR also comprises data related to feature and services the wireless subscriber has. The HLR is also used during roaming to verify the legitimacy of the subscriber and to provide them with their subscribed features. The HLR 56 may also be connected to the STP 34 and/or SCP 42 of the wireline network.

Graphical User Interfaces

Figure 3:
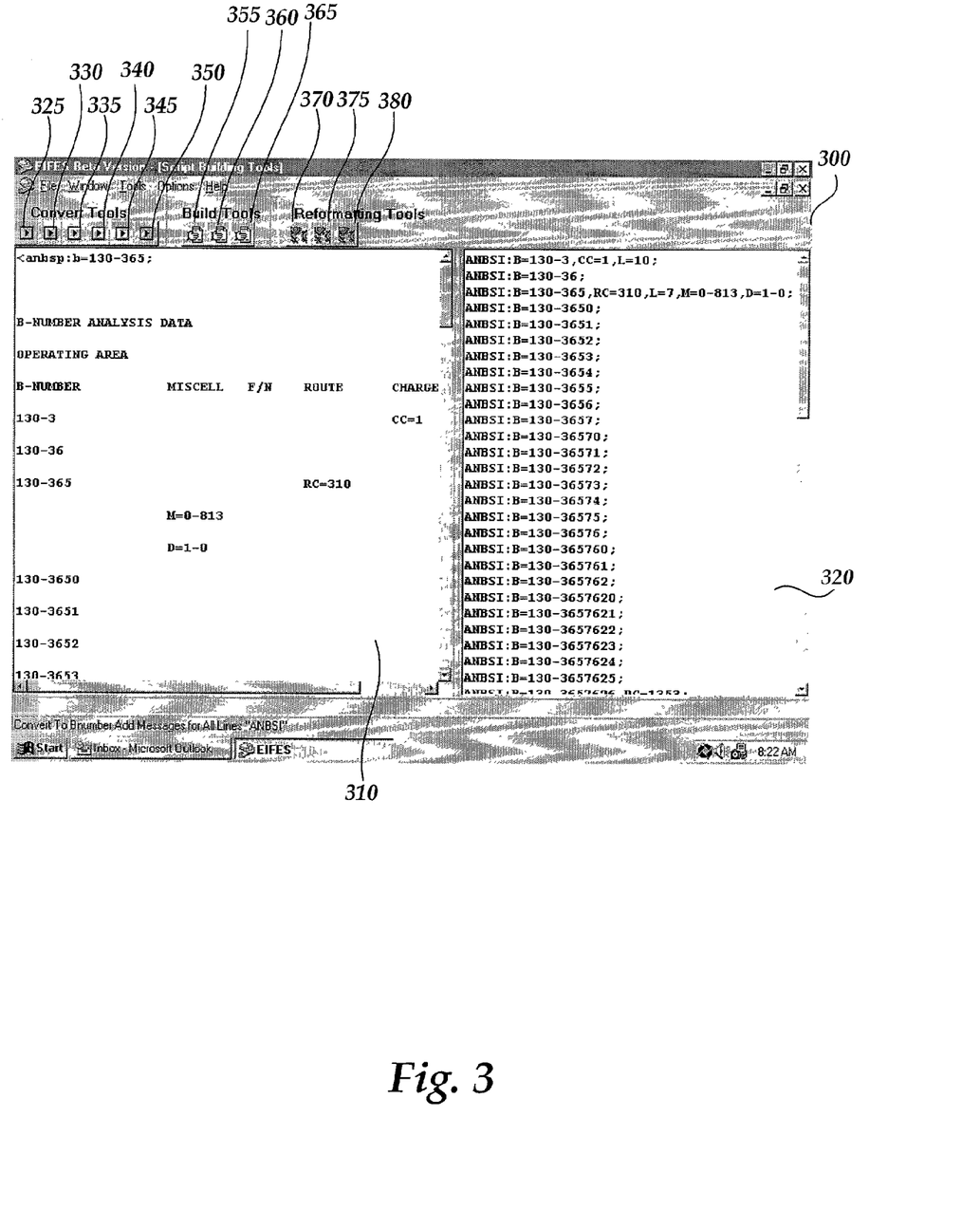
FIG. 3 illustrates a computer-generated graphical user interface for converting switch output data to switch input data according to an embodiment of the present invention.

FIGS. 3–8 illustrate computer-generated graphical user interfaces for downloading, editing, entering, and sending data to switches in accordance with an embodiment of the present invention. Referring to FIG. 3, the graphical user interface 300 is illustrated for downloading data 120 from a switch 12, 52 and converting the output data 120 to input data 130 for populating the switch 12, 52. As should be understood by those skilled in the art, the graphical user interface 300 is opened and displayed on the computer screen of a data entry operator by operation of the switch script-building software program 110, described above. According to an exemplary embodiment, the graphical user interface 300 via the software program 110 is operated as part of a Telnet session opened by the data entry operator to connect the data entry operator to the computing systems of the switch 12, 52. As should be understood by those skilled in the art, any suitable means for connecting the data entry operator directly to the switch 12, 52 for the transmission of data to and from the computing systems of the switch 12, 52 is acceptable in accordance with the present invention. For example, well-known file transfer protocol (FTP) may be used for transmitting data between a computing system of the data entry operator and the computing systems of the switch 12, 52.

Referring still to FIG. 3, upon selection of the software program 110 by the data entry operator for entry of or edit of data required by the switch 12, 52, the graphical user interface 300 is launched on the display of the operator's computer. Once the operator is connected to the computing system of the wireless switch 12, 52, the operator may download output data 120 from the switch 12, 52 via the Telnet program and then copy and paste the data into the output data work area 310 on the left side of the graphical user interface 300. For example, if the operator desires to enter new NPA-NXX's into the switch 12, 52, the operator may download presently available NPA-NXX data contained at the switch and copy that data into the work area 310.

Once the data is copied into the work area 310, selection of the Convert Tool 325 converts the output data 120 into input data 130, and the input-formatted data is displayed in the input data work area 320 on the right side of the graphical user interface 300. Accordingly, the input-formatted data displayed in the work area 320 is now in a format acceptable as input data by the switch 12, 52. The data entry operator may now enter the work area 320 and perform text edits on the input-formatted data to add new NPA-NXX's, delete existing NPA-NXX's, or edit existing NPA-NXX's. According to an embodiment of the present invention, edits to the input-formatted data in the work area 320 may be performed by standard text editing functions such as "find/replace," "delete," "add," etc. Additionally, a set of reformatting tools 370, 375, 380, described in detail below, are provided for customized data editing functionality. In accordance with the present invention, after the edits are made to the input-formatted data in the work area 320, the operator may send the input-formatted data directly to the switch 12, 52 for acceptance by the switch. According to one embodiment, the input-formatted data may be copied from the work area 320 and pasted into a file transfer program, such as a Telnet program, for sending the input-formatted data to the switch.

When data is added to the "B-Tables" or numbers to be dialed via the switch 12, 52, illustrated in FIG. 3, according to one embodiment, the switch automatically fills into the table the linking digits to maintain the chain of digits. For example, as shown in FIG. 3, the digits 130–3; 130–36; and 130–365, RC=310 are presented. As is understood by those skilled in the art, the digits "3" and "65" may be added automatically by the switch to maintain linking between those digits and other digits in the table. The last set of digits, 130–365, RC 310, represents valid data that is input. Normally, only valid data has to be re-input, so the Convert Tool button 325 omits the data that has been added to the table by the switch because the switch will add that linking data after the input-formatted data is sent back to the switch or switches according to the present invention. According to one embodiment of the invention, the digits without data following those digits are sometimes manually input into the switch to add digits that the switch may not link automatically. For example, referring to the work area 320, shown in FIG. 3, the first two sets of digits (130–3; 130–36) may be linked automatically, but some of the sets of digits (for example, 130–365; 130–3650) may be manually input according to the present invention after the output-formatted data has been converted to input-formatted data. In this case, the Convert Tool button 330 may be used to link all the digits to prevent necessary links from being broken.

Without the functionality of the present invention, as described with reference to FIG. 3, the data entry operator is forced to type line-by-line commands as illustrated in the work area 320 including all formatting such as semi-colons, equal signs, commas and other formatting protocols for each line of new data to be populated into the switch 12, 52. With the functionality of the present invention, the data entry operator is able to make use of data formatting that is already acceptable to the switch 12, 52 because that formatting is extracted from the switch 12, 52 in accordance with the present invention. The conversion process performed by the software program 110 to convert the output-formatted data 120 to input formatted data 130 may be performed using a variety of acceptable computer programming methods. According to one embodiment, a computer programming language such as the C programming language may be used whereby output data displayed in the work area 310 is displayed in the work area 320 with requisite formatting language. For example, the output data number "130-3650" shown in the work area 310 is converted to the formatting "ANBSI: B=130-3650" which is the required formatting for the wireless switch 12, 52. Other acceptable methods include a database lookup on each discrete output data to locate a corresponding input-formatted data for display in the work area 320.

Figure 4:
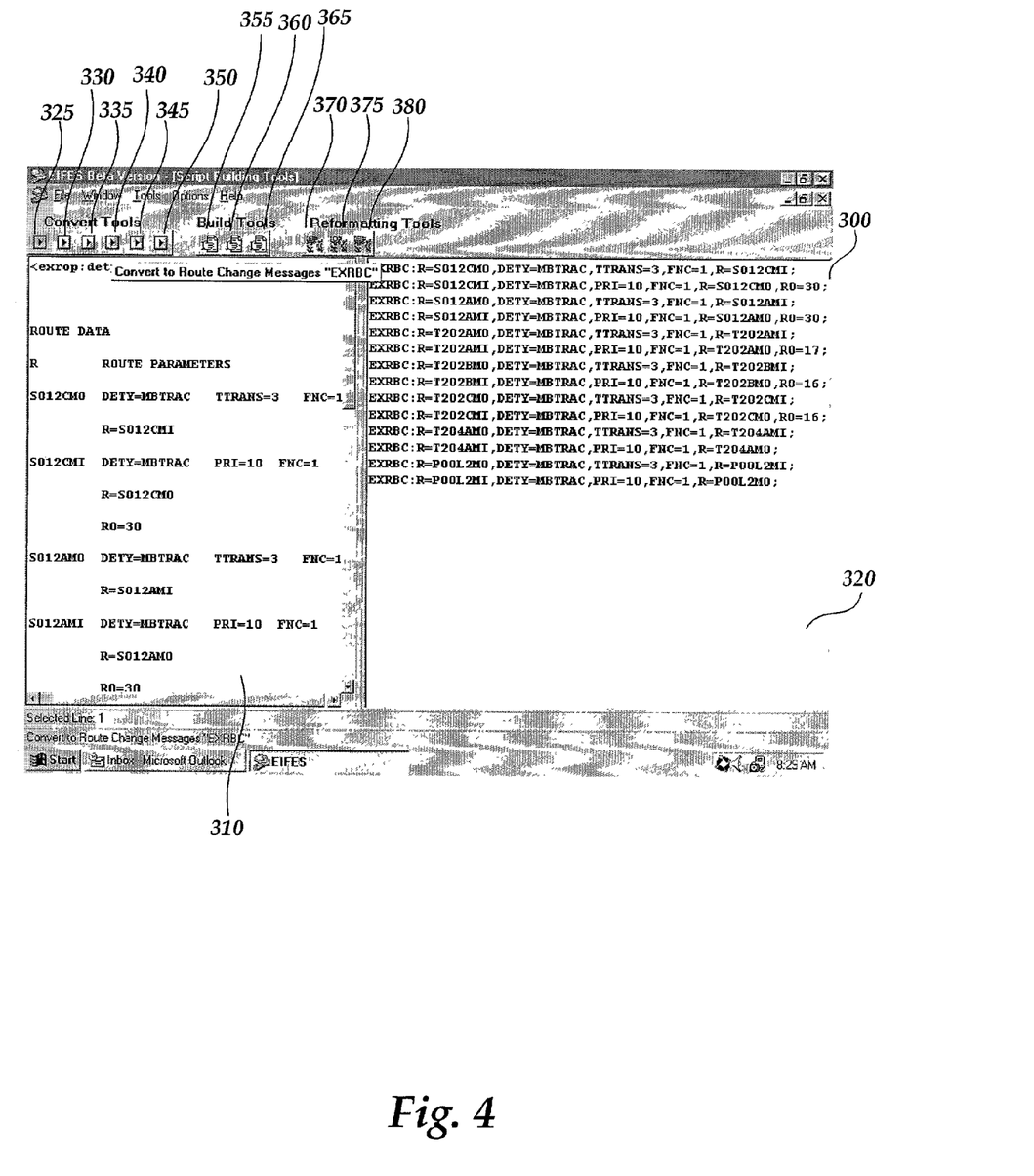
FIG. 4 illustrates a computer-generated graphical user interface for converting switch output data to switch input data according to an embodiment of the present invention.

Referring to FIG. 4, output data 120 for switch routing information is displayed in the work area 310 and the corresponding input-formatted route information data is shown in the work area 320. As is known by those skilled in the art, wireless switches 52 contain routing information for setting up call paths between cellular telecommunication sites and landline sites. The graphical user interface illustrated in FIG. 4 shows the downloading of output-formatted routing information and the conversion of that output-formatted routing information to input-formatted information as shown in the work area 320. As described above, the Convert Tools such as the Convert Tool 340 may be selected for conversion of the routing information from output format to input format. After the routing information has been converted to input-format, the data entry operator may then edit the input-formatted routing information to add, delete, or edit the routing information before sending the input-formatted routing information back to the wireless switch 52 or to a new wireless switch 52. As described above, and as should be understood by those skilled in the art, the data entry operator may add or edit information in accordance with the present invention and then populate all wireless switches in a telecommunications system with the same input-formatted information.

Figure 5:
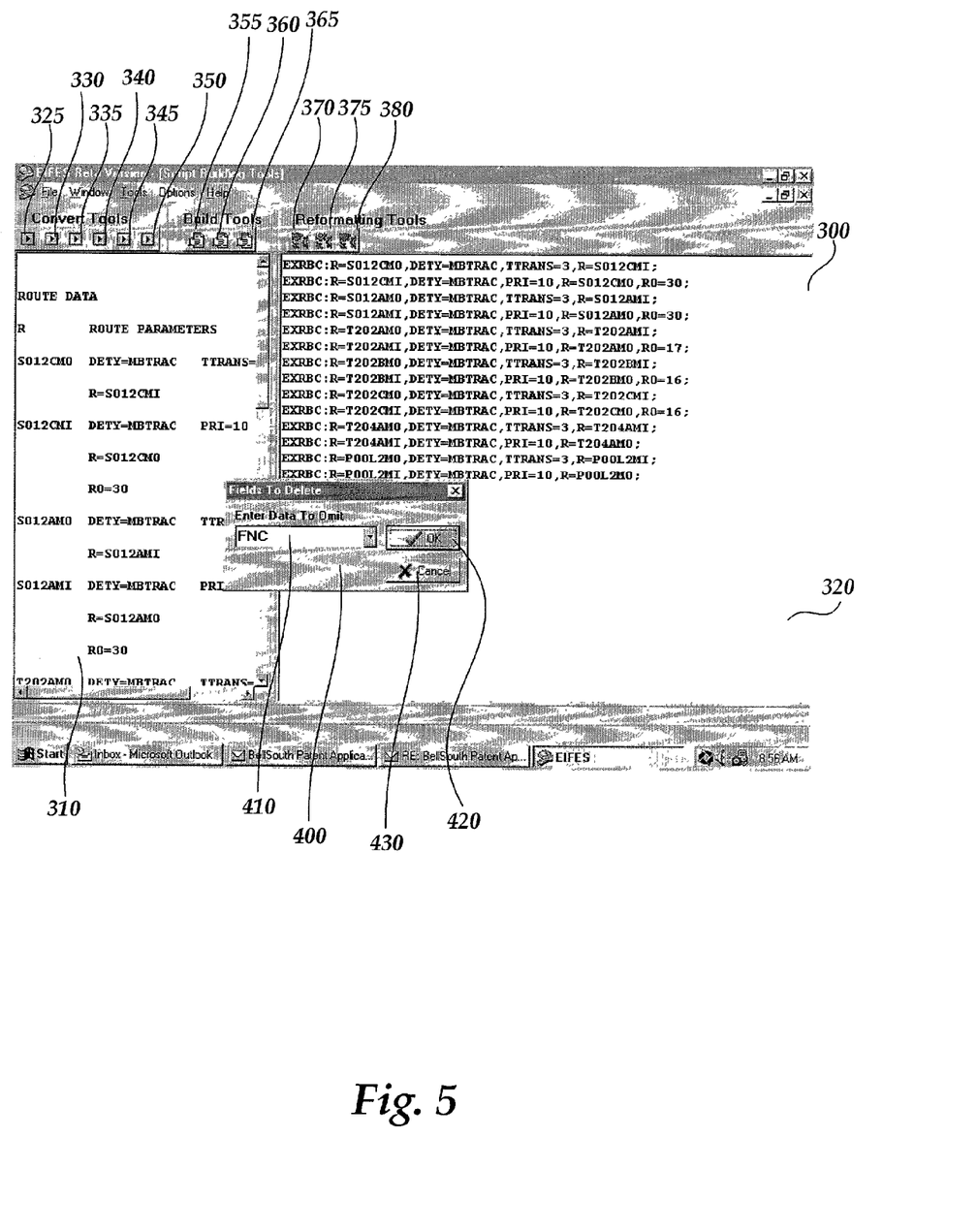
FIG. 5 illustrates a computer-generated graphical user interface for reformatting switch input data converted from switch output data.
Figure 6:
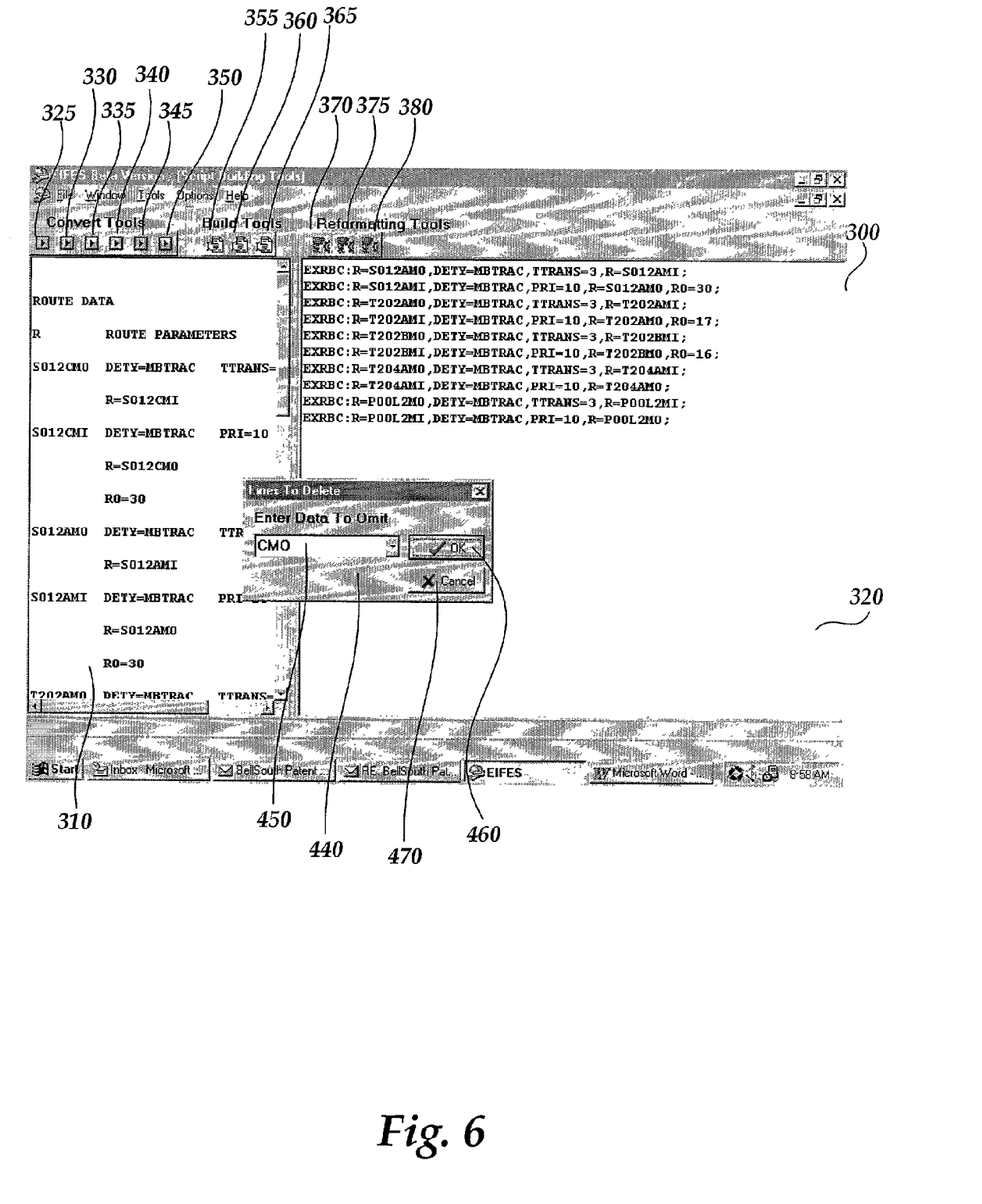
FIG. 6 illustrates a computer-generated graphical user interface for reformatting switch input data converted from switch output data.

Referring to FIG. 5, a dialog box 400 is illustrated corresponding to the Reformatting Tool button 370 for customized editing of the input-formatted data displayed in the work area 320. Selection of the Reformatting Tool button 370 causes the dialog box 400 to be displayed to allow the data entry operator to delete prescribed data fields from the input-formatted data. For example, the operator may use the dialog box 400 to delete the entry "DETY=MBTRAC" from every data line displayed in the input-formatted data in the work area 320. Referring to FIG. 6, a dialog box 440 is illustrated for allowing the operator to delete whole lines from the input-formatted data displayed in the work area 320. The dialog box 440 is launched by selection of the Reformatting Tool button 375. For the dialog boxes 400 and 440, the OK buttons 420, 460 and CANCEL buttons 430, 470 are selected to initiate the editing function or to cancel the editing function, respectively. The data entry areas 410, 450 are used for entering the character string associated with the deletion function. The Reformatting Tool button 380 launches a dialog box, not illustrated, for adding alternate lines of data to the input-formatted data displayed in the work area 320.

Figure 7:
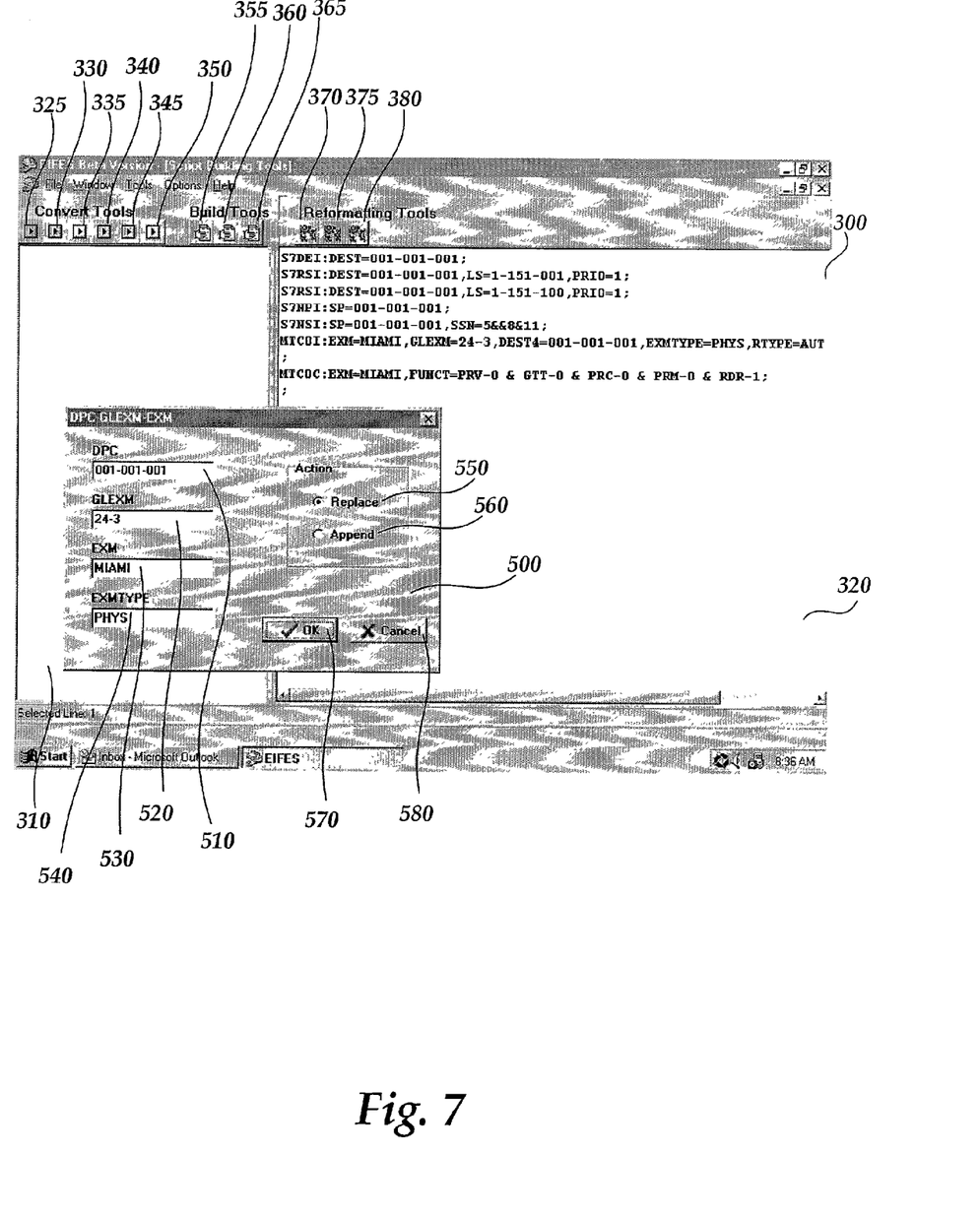
FIG. 7 illustrates a computer-generated graphical user interface for entering NPA-NXX data for setting up roaming privileges on a wireless telecommunications switch.

Referring now to FIG. 7, a dialog box 500 is illustrated for populating a wireless switch 52 with roaming privileges data for a new roaming partner of the wireless telecommunications system operating the wireless switch 52. As is well known to those skilled in the art, in order for a wireless telephone user to operate in a wireless telecommunications system under which the user has no operating privileges, the user must "roam" using the telecommunications functionality of that telecommunications system. In order to roam, the user's home wireless telecommunications system must arrange for the user to roam in the service area provided by the roaming telecommunications system. To allow roaming, the home telecommunications system sends information on the roaming user to the roaming telecommunications system for population into the wireless switches 52 of the roaming telecommunications system. That is, if the wireless telephone user attempts to use her telephone in a roaming area, the wireless switches 52 receiving and routing wireless telephone calls from the user must recognize the user as having roaming privileges on that switch. Accordingly, data entry operators of the roaming telecommunications system must enter into the wireless switches 52 of that system the NPA-NXX's, identification information, and billing information for each wireless telephone that will be allowed to roam using the wireless switches 52 of the roaming telecommunications system.

The dialog box 500 is illustrated for establishing communication links between the wireless switch 52 of the roaming telecommunications system and wireless switches 52 of the roaming user's home telecommunications system. Data identifying the communication link, data labeling the communication link, data locating the communication link and data describing the type of communication link, such as a physical link, is entered in the data entry boxes 510, 520, 530, and 540, respectively. According to the preferred form illustrated in FIG. 7, the data entry box 510 is for entry of the destination point code, or address of the switch. The data entry box 520 is for entry of switch site identification, for example a cellular site in South Florida. The data entry box 530 is for entry of a location name for the switch. And, the data entry box 540 is for entry of the type of switch, such as physical or virtual. Selection of the OK button 570 causes the data to be formatted as input data and displayed in the work area 320, as illustrated in FIG. 7. As described above with reference to FIGS. 3–6, if the data entry operator first downloads existing communication link information from a wireless switch 52, that data is downloaded in output format into the work area 310, followed by conversion of the output-formatted data to input-formatted data shown in the work area 320. The dialog box 500 may then be used to replace input-formatted data with new data or to append new data to the input-formatted data displayed in the work area 320.

Figure 8:
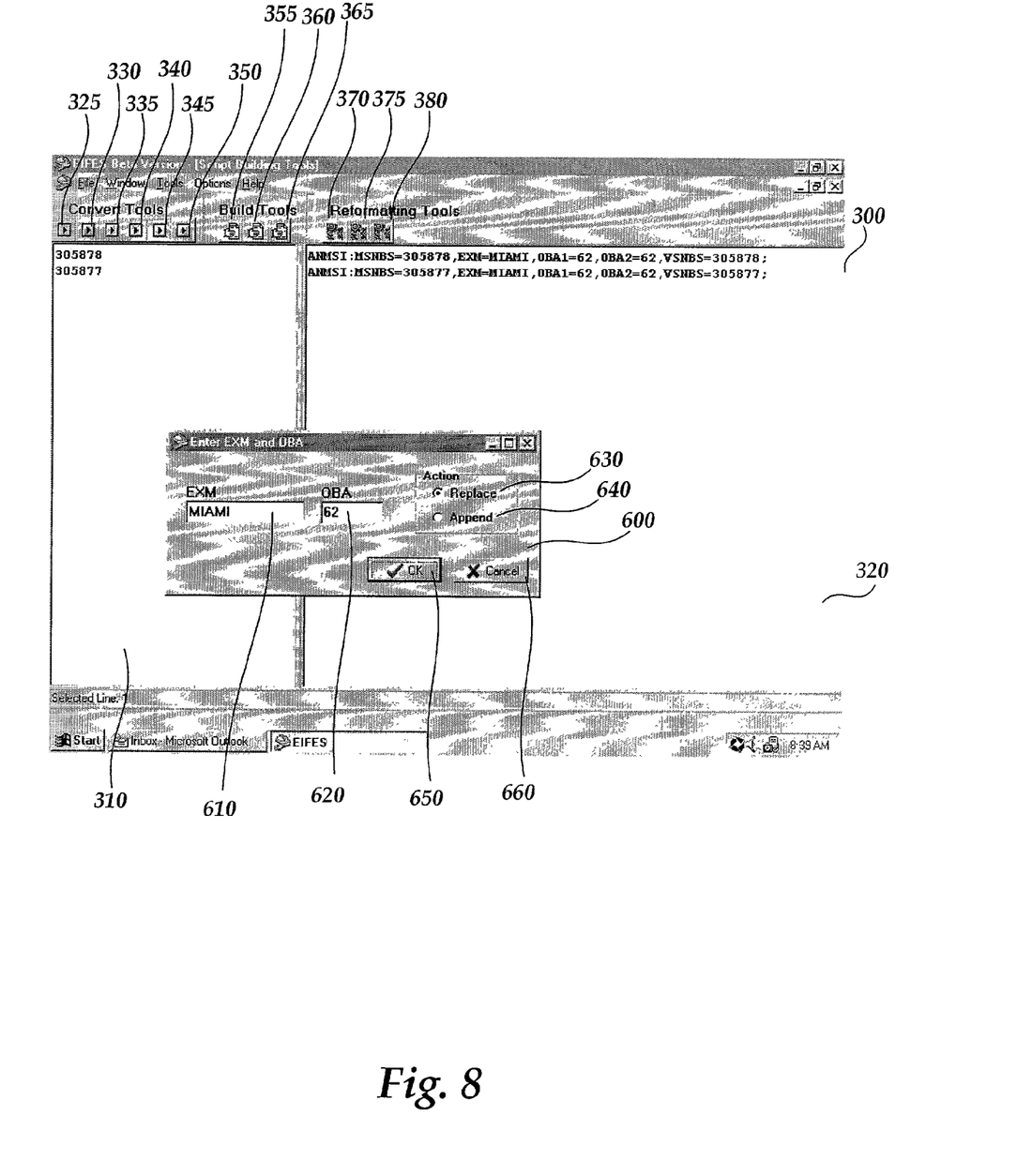
FIG. 8 illustrates a computer-generated graphical user interface for entering communication link data for setting up roaming privileges on a wireless telecommunications switch.

Referring to FIG. 8, a dialog box 600 is illustrated for populating data from the roaming user's home wireless telecommunications system into the wireless switch 52 of the roaming telecommunications system. That is, the data entry operator receives data from the home system such as the NPA-NXX's illustrated in the work area 310 of FIG. 8, and that data is converted to input format and displayed in the work area 320. Next, the data entry operator uses the dialog box 600 to combine the communication link data prepared using the dialog box 500, illustrated in FIG. 7, with the new input-formatted data received from the home telecommunications system of the wireless telephone user. That is, selection of the OK button 650 of the dialog box 600 generates all the text messages shown in the work area 320 needed to combine the communications link information created using the dialog box 500 with the new information obtained from the home service provider so that the combined information may be sent to the wireless switch 52 of the roaming service provider for population into the switches of the roaming telecommunications system.

Operation of an Embodiment of the Present Invention

Figure 9:
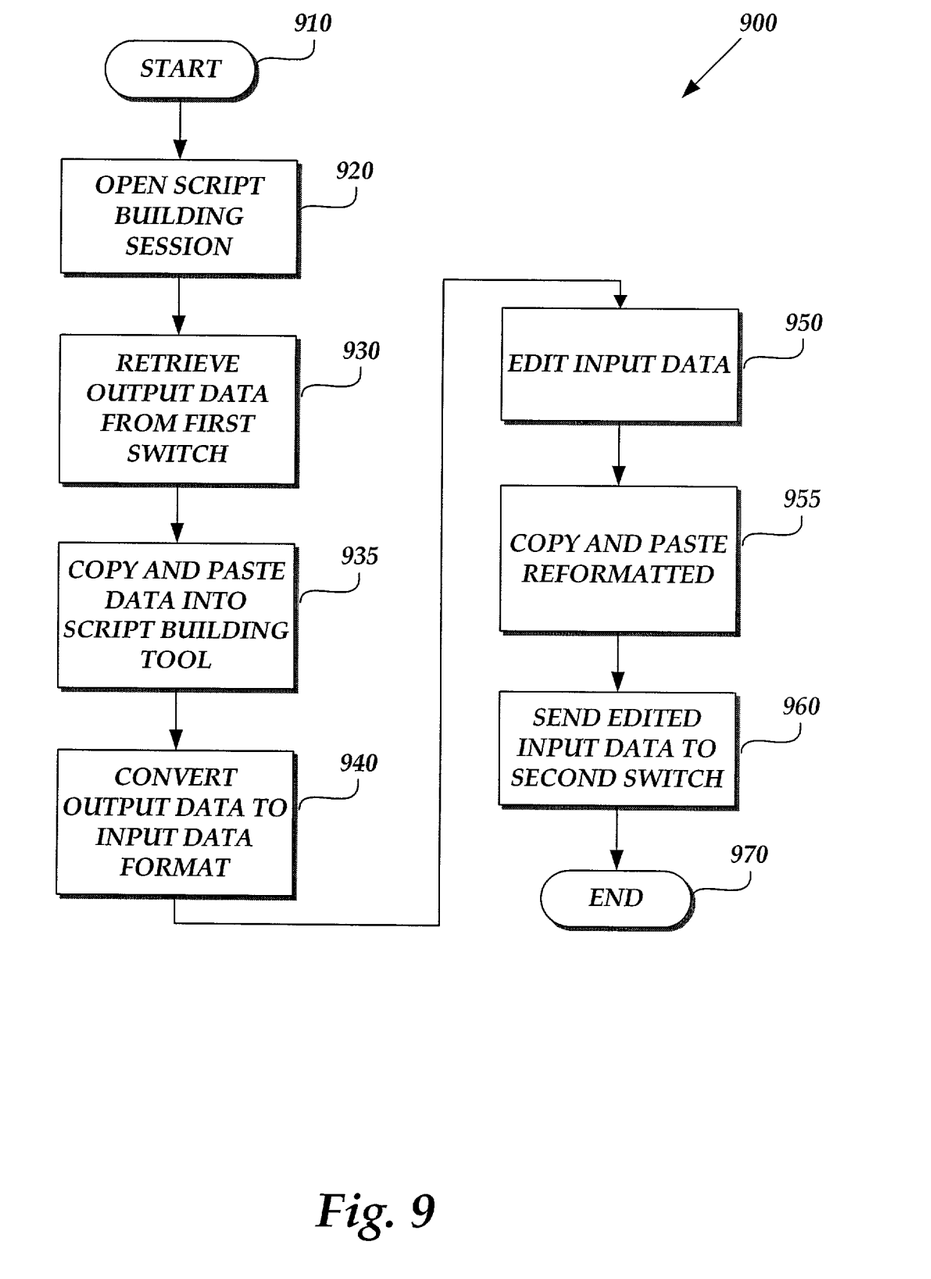
FIG. 9 illustrates an operational flow of steps performed by a system and method of the present invention for preparing input data for a wireless telecommunications switch.
Figure 10:
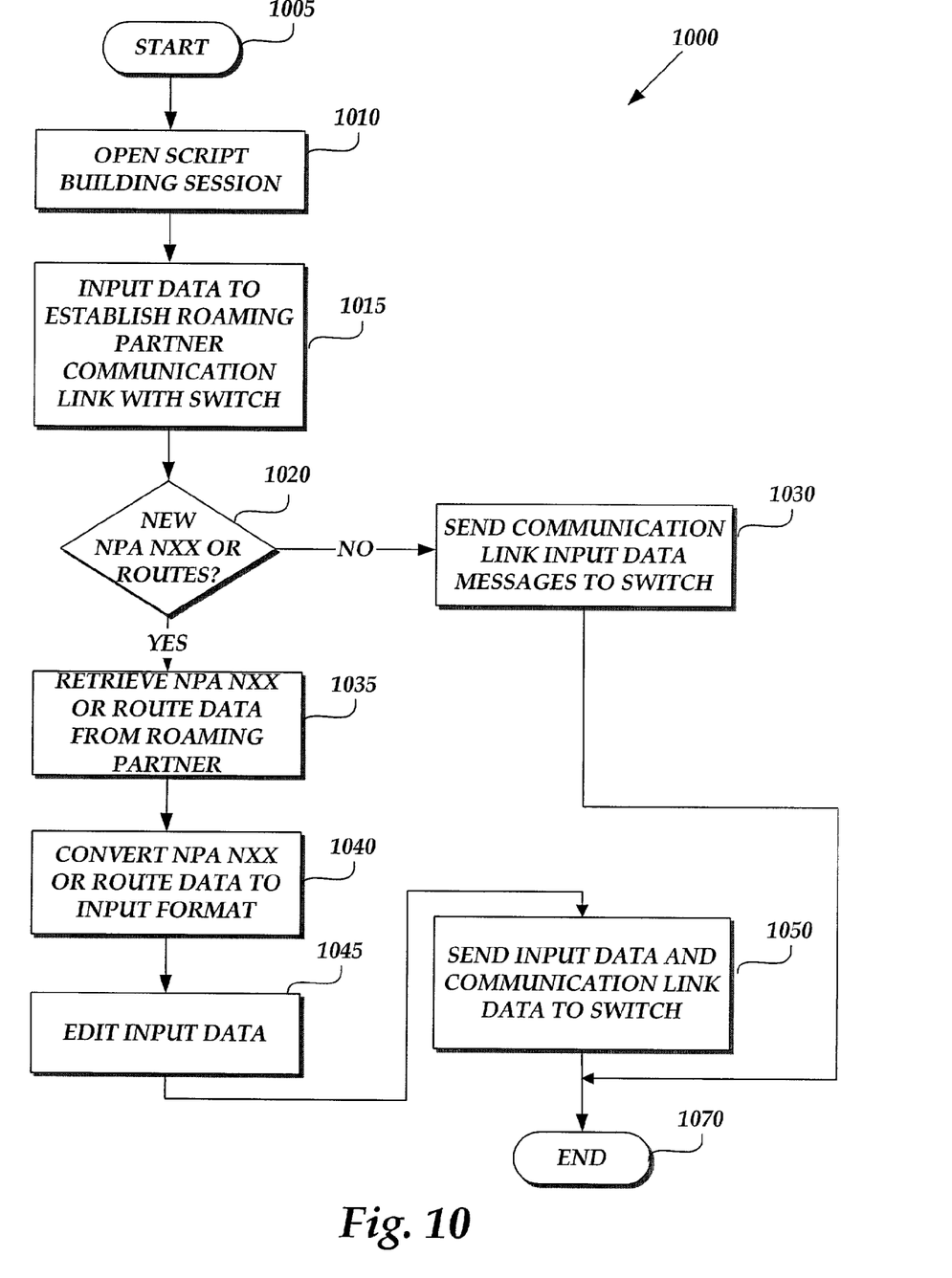
FIG. 10 illustrates an operational flow of the steps performed by a system and method of the present invention for preparing input data for a wireless telecommunications switch associated with a new roaming services partner.

Having described an exemplary operating environment and exemplary graphical user interfaces for the present invention with reference to FIGS. 1~8, FIG. 9 illustrates an operational flow of steps performed by a system and method of the present invention for preparing input data for a wireline and wireless telecommunications switch, and FIG. 10 illustrates an operational flow of the steps performed by a system and method of the present invention for preparing input data for a wireless telecommunications switch associated with a new roaming services partner. For purposes of description of the operational flow illustrated in FIG. 9, assume, for example, that a data entry operator of a wireline or wireless telecommunications system must enter new NPA-NXX data for a set of newly activated telephones for use in the telecommunications system.

The method 900 begins at start step 910 and proceeds to step 920 where the data entry operator opens a script building session for entry of the new NPA-NXX's for the newly activated telephones. According to the present example, the operator opens a Telnet session on the operator's computing system and establishes a communication link with the switch 12, 52. Once the operator has established a communications link for transferring data to and from the wireless switch 12, 52 via the Telnet session, the operator launches the switch script-building software program 110 of the present invention. After opening the software program 110, the operator launches the graphical user interface 300, illustrated in FIG. 3.

At step 930, the operator downloads from the switch 12, 52 output-formatted data via a file transfer program, such as Telnet. At step 935, the operator copies the data into the work area 310, as illustrated in FIG. 3, representing a current set of NPA-NXX data populated in the switch 12, 52. At step 940, the operator selects the Convert Tool button 325 to convert the output-formatted data to input-formatted data illustrated in the work area 320.

At step 950, the data entry operator edits the entry-formatted data displayed in the work area 320 of the graphical user interface 300. As described above, the operator may simply add the NPA-NXX data for the newly activated telephones to the input-formatted data while maintaining the formatting of that data as displayed in the graphical user interface 300. The operator may enter the new data using standard text editing commands, or the operator may select one of the Reformatting Tools 370, 375, 380 as desired for customized editing. According to the present example, the operator may select the Reformatting Tool button 380 for entry of lines of text representing the NPA-NXX data of the newly activated telephones into the input-formatted text displayed in the work area 320. At step 955, the operator may copy and paste the input-formatted data back into the Telnet program to send the input-formatted data to the switch 12, 52.

At step 960, after the operator has completed all text editing of the input-formatted data, the operator sends the properly input-formatted data to the switch 12, 52. Because the data has been formatted for acceptance by the switch 12, 52, the data is accepted, and the NPA-NXX data for the newly activated telephones are populated into the switch 12, 52. As should be understood by those skilled in the art, the operator may enter other types of information such as routing information, billing information, and the like according to the foregoing operational flow. Additionally, the operator may download output-formatted data from any switch 12, 52 in the telecommunications system to obtain the proper formatting for inputting data back into a given telecommunications switch or for inputting properly formatted data into a number of telecommunications switches within the telecommunications system. After the formatted and edited data is sent to the switch 12, 52, with reference to step 960, the method ends at step 970.

For purposes of discussion of the operational flow illustrated in FIG. 10, assume that a data entry operator must enter new roaming privileges information to allow roaming wireless telephone users to utilize the services of the operator's telecommunications system. The method 1000 begins at step 1005 and proceeds to step 1010 where the operator opens a script-building session, as described above. The operator launches the functionality of the switch script-building software program 110 and opens the graphical user interface 300 and dialog box 500 illustrated in FIG. 7.

At step 1015, utilizing the dialog box 500, the operator enters into the data entry boxes 510, 520, 530, and 540 information identifying the communication link between the wireless switches 52 of the roaming telecommunications system and the home telecommunications system of the roaming wireless telephone users. The operator selects the OK button 570 of the dialog box 500 and the input-formatted data corresponding to the communication link data input by the operator is formatted and displayed in the work area 320, illustrated in FIG. 7.

At step 1020, a determination is made as to whether any new NPA-NXX's or routing information is available for populating the wireless switches 52 along with the identification information for the communication links entered using the dialog box 500. If no, the method proceeds to step 1030 and the properly input-formatted communication link data messages, illustrated in the work area 320, are sent to the wireless switch 52. The method then ends at step 1070.

If new NPA-NXX data or routing information are available for populating the wireless switches 52 along with the communication link data, the method proceeds to step 1035 and the NPA-NXX data or routing data is retrieved from the wireless telecommunications system desiring roaming privileges with the system of the data operator. As illustrated in FIG. 8, the new NPA-NXX data is retrieved and loaded into the work area 310 of the graphical user interface 300. It should be understood that the new NPA-NXX information may be downloaded electronically from the other telecommunications system or that data may be cut and pasted from a separate electronic document into the work area 310.

At step 1040, the output-formatted NPA-NXX data is converted to the input-formatted data, illustrated in the work area 320 of FIG. 8. At step 1045, the input-formatted data is edited by the data entry operator as required. The operator then launches the dialog box 600 illustrated in FIG. 8 to combine the new NPA-NXX data with the communication link data prepared with reference to FIG. 7. Selection of the OK button 650 combines the communication link data described above with the input-formatted NPA-NXX data.

At step 1050, the input-formatted NPA-NXX data and input-formatted communication link data are sent to the wireless switch 52 to populate the wireless switch 52 with information required to allow the roaming wireless telephone users to roam in the wireless telecommunications system via the wireless switch 52. As should be understood by those skilled in the art, input-formatted data generated in accordance with the present invention may be sent to the wireless switch 52 according to a number of acceptable data transfer protocols. Likewise, the properly input-formatted data may be cut and pasted into a number of different software application programs capable of transmitting data from the data entry operator to the wireless switch 52.

As described, a system and method are provided for improved preparation of and population of data into a wireless telecommunications switch. It will be appreciated by those skilled in the art that various modifications or variations may be made in the present invention without departing from the scope or spirit of the invention. Other embodiments of the invention will be apparent to those skilled in the art from consideration of the specification and practice of the invention disclosed herein.

I claim:

1. A method of formatting data for populating a telecommunications switch, comprising:
using a switch script-building program to extract output-formatted data from the switch;
converting the output-formatted data to input-formatted data acceptable for input to the switch;
editing the input-formatted data, wherein editing the input-formatted data includes adding new data to the input-formatted data according to a format of the input-formatted data, whereby the new data comprises routing information, roaming information and NPA-NXX data;
transmitting the input-formatted data to the switch; and
populating the switch with the input-formatted data.

2. The method of claim 1, further comprising
opening a link between a first computing system and the switch; and
transmitting the input-formatted data to the switch via the link between the first computing system and the switch.

3. The method of claim 2, wherein opening a link between a first computing system and the switch includes opening a Telnet session at the first computing system; and
establishing a communications link for transmitting data to and from the first computing system and the switch.

4. The method of claim 3, wherein
extracting output-formatted data from the switch includes:
using a switch script-building program to extract output-formatted data from the switch, wherein extracting output-formatted data from the switch includes launching a data formatting program on the first computing system, opening a graphical user interface for receiving downloaded output-formatted data from the switch, and copying the output-formatted data into the graphical user interface;
converting the output-formatted data to input-formatted data acceptable for input to the switch;
editing the input-formatted data, wherein the step of editing the input-formatted data includes adding new data to the input-formatted data according to a format of the input-formatted data whereby the new data comprises routing information, roaming information and NPA-NXX data;
opening a link between a first computing system and the switch, wherein opening a link between a first computing system and the switch includes opening a Telnet session at the first computing system, and establishing a communications link for transmitting data to and from the first computing system and the switch;
transmitting the input-formatted data to the switch via the link between the first computing system and the switch; and
populating the switch with the input-formatted data.

5. The method of claim 1, wherein editing the input-formatted data includes deleting data from the input-formatted data.

6. The method of claim 1, wherein transmitting the input-formatted data to the switch includes transmitting the input-formatted data to a second switch.

7. The method of claim 1, wherein transmitting the input-formatted data to the switch includes transmitting the input-formatted data to a plurality of switches.

8. The method of claim 1, wherein populating the switch with the input-formatted data includes populating a second switch with the input-formatted data.

9. The method of claim 1, wherein populating the switch with the input-formatted data includes populating a plurality of switches with the input-formatted data.

10. The method of claim 1, the input-formatted data includes identification information for identifying a wireless switch for a roaming telecommunications system and identification information for a residential telecommunication system.

* * * * *